(12) United States Patent
Tiemann et al.

(10) Patent No.: US 10,578,494 B1
(45) Date of Patent: Mar. 3, 2020

(54) COMPACT WAVELENGTH METER AND LASER OUTPUT MEASUREMENT DEVICE

(71) Applicant: LOCKHEED MARTIN COHERENT TECHNOLOGIES, INC., Louisville, CO (US)

(72) Inventors: Bruce Gregory Tiemann, Longmont, CO (US); Paul Johan Mikael Suni, Berthoud, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 23 days.

(21) Appl. No.: 15/893,492

(22) Filed: Feb. 9, 2018

Related U.S. Application Data

(60) Provisional application No. 62/457,782, filed on Feb. 10, 2017.

(51) Int. Cl.
*G01J 9/02* (2006.01)
*G01J 3/45* (2006.01)
*G01J 3/453* (2006.01)

(52) U.S. Cl.
CPC ............. *G01J 9/0246* (2013.01); *G01J 3/45* (2013.01); *G01J 3/4532* (2013.01); *G01J 9/02* (2013.01); *G01J 2009/0288* (2013.01)

(58) Field of Classification Search
CPC .... G01J 9/00; G01J 9/02; G01J 9/0246; G01J 2009/028; G01J 2009/0288; G01J 3/45; G01J 3/4532
See application file for complete search history.

(56) References Cited

U.S. PATENT DOCUMENTS

| | | | |
|---|---|---|---|
| 7,280,216 B2 * | 10/2007 | Snyder | G01J 9/0246 356/451 |
| 2002/0154662 A1 * | 10/2002 | Turpin | G02B 5/284 372/20 |
| 2002/0163646 A1 * | 11/2002 | Anderson | G01J 9/00 356/477 |
| 2018/0100967 A1 * | 4/2018 | Parker | G02B 6/12004 |

* cited by examiner

*Primary Examiner* — Michael A Lyons
(74) *Attorney, Agent, or Firm* — Morgan, Lewis & Bockius LLP

(57) ABSTRACT

An apparatus includes a photonic integrated circuit (PIC) to measure an optical wavelength of a light source. The PIC includes an optical splitter, a plurality of tunable interferometers and one or more detectors. The optical splitter is coupled to the light source, and the interferometers are coupled to the optical splitter. Each interferometer receives a portion of an optical signal of the light source. One or more detectors are coupled to each interferometer, and the interferometers have different free spectral ranges (FSRs). A largest FSR value of the different FSRs is greater than an entire intended wavelength measurement range of the PIC.

20 Claims, 10 Drawing Sheets

COMPACT WAVELENGTH METER AND LASER OUTPUT MEASUREMENT DEVICE

CROSS-REFERENCE TO RELATED APPLICATIONS

This application claims the benefit of priority under 35 U.S.C. § 119 from U.S. Provisional Patent Application 62/457,782 filed Feb. 10, 2017, which is incorporated herein by reference in its entirety.

STATEMENT REGARDING FEDERALLY SPONSORED RESEARCH OR DEVELOPMENT

Not applicable

FIELD OF THE INVENTION

The present invention generally relates to optoelectronics, and more particularly, to a compact photonic integrated circuit (PIC)-based wavelength meter and laser output measurement device.

BACKGROUND

Tunable lasers can produce outputs at a variety of wavelengths, and even non-tunable lasers can typically have their operating output frequencies altered, at least over a small range. The output frequency alteration (e.g., tunability) can occur, for example, by varying the optical or electrical power provided to the laser gain medium, or by altering the temperature of the gain medium. With this tunability comes uncertainty, which is not desirable in many applications. Often times the exact operating wavelength is important, for instance, to hit a certain absorption, transmission window, or atomic transition wavelength.

Accordingly, laser wavelength meters exist that can accept a portion of a laser's output beam, and measure the wavelength of that beam with sufficient accuracy and precision to determine whether the wavelength is correct or needs adjustment. These wavelength meters may come in a variety of sizes and performance levels. It is understood that accuracy, precision, and measurement speed may be the major performance parameters. Typical commercial units for measurement of optical frequency down to the ~100 MHz level may be substantially large, and can make up to a thousand measurements a second.

SUMMARY

According to various aspects of the subject technology, methods and configuration are disclosed for providing a compact photonic-integrated circuit (PIC) based interferometer. The interferometer of the subject technology includes multiple interferometers with different free spectral ranges (FSRs) and is far smaller and more rugged compared to the conventional interferometers. The disclosed interferometer is capable of measuring the wavelength of a light source such as a tunable laser and can provide an unambiguous measured wavelength.

In one or more aspects, an apparatus includes a PIC to measure an optical wavelength of a light source. The PIC includes an optical splitter, a plurality of tunable interferometers and one or more detectors. The optical splitter is coupled to the light source, and the interferometers are coupled to the optical splitter. Each interferometer receives a portion of an optical signal of the light source. One or more detectors are coupled to each interferometer, and the interferometers have different free spectral ranges (FSRs). A largest FSR value of the different FSRs is greater than an entire intended wavelength measurement range of the PIC.

In other aspects, a method for measuring an optical wavelength of a light source includes splitting output light of a light source to form multiple optical beams. The method further includes measuring optical fringes associated with a number of optical beams by detectors coupled to the interferometers. Phases and periods associated with the measured optical fringes are extracted, and based on the extracted phases and periods, the optical wavelength of the light source is determined. Measuring the optical fringes is performed by a number of interferometers having different free spectral ranges (FSRs) disposed on a PIC. The largest FSR value of the interferometers is greater than an entire intended operating range of the PIC.

In yet other aspects, a PIC includes an optical splitter, a number of interferometers, one or more detectors and a phase modulation spectroscopy path. The optical splitter is coupled to a light source and can generate multiple optical beams. A number of interferometers are coupled to the optical splitter to receive respective optical beams. The detectors are coupled to the interferometers, and the phase modulation spectroscopy path allows corrections of deviations due to one or more environmental variations. The interferometers have different ambiguity intervals, and the largest ambiguity interval value of the interferometers is greater than an entire intended wavelength measurement range of the PIC.

The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

According to some aspects of the subject technology, methods and configuration are disclosed for providing a compact Photonic Integrated Circuit (PIC)-based interferometer. The interferometer of the subject technology is far smaller and more rugged compared to the conventional interferometer. The existing wavelength meters may not be suitable for applications with lasers having higher repetition rate beyond about 1000 measurements per second or with higher continuous tuning bandwidth than 500 Hz (e.g., the Nyquist bandwidth from measurements at a 1 kHz rate). Additionally, lasers may have agile output waveforms, such as a wavelength versus time pattern (e.g. a chirp) during a single pulse, lasting about tens or hundreds of nanosecond (ns). The subject compact laser wavelength measurement device provides a readout capability at substantially higher than 1 kHz rate that can be used to obtain servo information in a continuous-wave context at bandwidths far in excess of 500 Hz.

Figure 1:
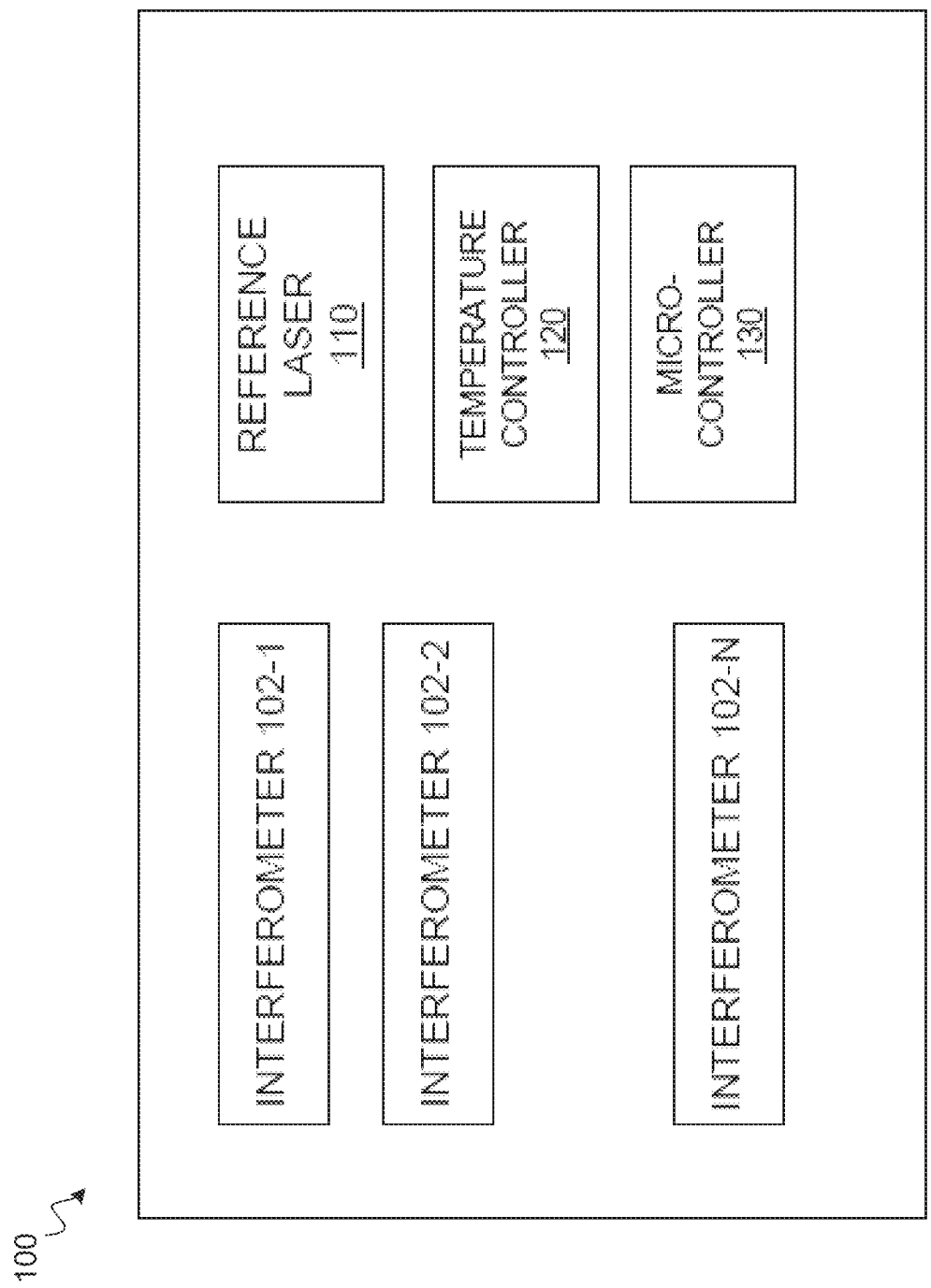
FIG. 1 is a high-level block diagram illustrating an example of a compact photonic integrated circuit (PIC)-based wavelength meter, according to certain aspects of the disclosure.

FIG. 1 is a high-level block diagram illustrating an example of a compact photonic integrated circuit (PIC)-based wavelength meter 100, according to certain aspects of the disclosure. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided. The compact PIC-based wavelength meter 100 includes a collection of tunable interferometers 102 (e.g., 102-1 through 102-N), a reference laser 110, a temperature stabilizer 120 and a microcontroller 130, which can be integrated into a PIC.

In some embodiments, the tunable interferometers 102 can be asymmetric Mach-Zehnder interferometers (AMZIs), spanning a range of Free-Spectral Ranges (FSRs). Each interferometer 102 is constructed to have an optical phase modulator contained within the optical path defining the interferometer, which may be tuned, e.g. by an electro-optic effect or by a thermo-optical effect, such that the optical path length of the interference pattern may be shifted by a significant fraction of a wavelength or more. Alternatively, the optical path length could be altered by an electro-optic modulator, providing the possibility of sweeping through an entire fringe in 1 ns or less. The phase of this fringe (e.g., where it is brightest and dimmest, relative to the heater power or drive voltage) is recorded. Because there are a collection of interferometers, a collection of fringe phases can be simultaneously recorded. The phases of the fringes from each of these interferometers, taken together, can uniquely determine the input wavelength, so long as the interferometer FSRs are appropriately chosen. One strategy for FSR choice is to arrange the FSR, for example, the ambiguity interval of the interferometer, with the largest FSR, to be greater than the entire intended operating range of the wavelength meter. The phase it produces amounts to a coarse wavelength measurement, with some uncertainty arising from finite signal-to-noise ratio (SNR).

The next smaller interferometer is chosen to have an FSR that is less than the largest FSR, but still larger than the uncertainty with which the fringe phase from the first interferometer can be confidently placed within. In other words, the interferometer with the next smaller FSR has its FSR chosen in the following way: Uncertainty in the phase measurement of the fringe from the device with the largest FSR leads to an uncertainty in the corresponding wavelength measurement. This wavelength uncertainty corresponds to an optical frequency uncertainty. The FSR of the device with the next smaller FSR is chosen to be a safety factor larger than unity times this aforementioned optical frequency uncertainty. For example, if the wavelength uncertainty of measurement of the device with the largest FSR corresponds to about 2 THz, then the FSR of the next smaller device has to preferably exceed 2 THz, e.g. it can be about 3 THz, which corresponds to a safety factor of about 1.5 times the uncertainty of about 2 THz. Different applications may require safety factors other than the value of about 1.5 used in this example, which is used by way of example but not limitation. Because the SNR of any given fringe may be much better than 2, it may be possible to impute a wavelength to much better than half the FSR, which would lead to an FSR ratio between devices of adjacent FSR that is considerably different from about 2:1, that is, it may be possible to use a strategy that is significantly better than binary dissection. The fringe phase of the second interferometer amounts to a finer wavelength measurement, which may be ambiguous within the entire tuning range of the device, except that the ambiguity is resolved by the measurement from the first interferometer. However, the precision of even the second measurement may be insufficient for system requirements. Accordingly, additional interferometers are added, for example, with a strategy such that each interferometer has an ambiguity interval that safely exceeds the measurement imprecision of the device with the next larger FSR, but has an FSR that is sufficiently smaller to add significant precision to the resulting wavelength measurement.

If the SNR of the fringes is about 20, then the phase of each fringe can be measured quite confidently to about $\frac{1}{20}$ of a cycle, (e.g., to $\frac{1}{20}$th of a radian, which equals $\frac{1}{20}$th of a cycle, divided by $2\pi$). In this case, the FSRs may differ by a ratio of 10-to-1, (giving a comfortable safety margin), in which case 6 interferometers taken together would give a measurement imprecision of one millionth of the ambiguity interval of the interferometer with the largest FSR. This would enable a 6-decimal-place measurement, which can be sufficient in some cases. If this precision is not sufficient, additional interferometers could be added.

The interferometers can be temperature-stabilized (e.g., using temperature stabilizer 120) to keep the fringe phases stabilized. Alternatively, the fringe phase could be periodically, or, simultaneously, measured with a probe beam produced by a frequency-stabilized laser (e.g., reference laser 110) of known wavelength. Although the longest path-length interferometers may have to be tens of centimeters long, waveguides of this length can be wound into a spiral of about 1 mm$^2$ area, given waveguides that can safely be run within a few microns of another without significant interference or cross-talk. Therefore, the entire components, including several interferometers, detectors, and other support components, can realistically be contained within a PIC, the size of a postage stamp.

Support electronics would include a temperature controller 120. One or more microcomputers (e.g., microcontrollers) 130 to store phase-versus-wavelength lookup tables, and to control driving the phase modulators and to process the received photodetector signals. The reference laser 110 could be included within the PIC made from a semiconductor laser of ~1 mm$^3$ volume. A frequency reference, for example, a gas cell, could be an actual cell of ~1×1×10 mm. In some embodiments, the frequency reference could be integrated within the PIC, for example, through the use of evanescent coupling, guided or free-space propagation through a void containing the reference gas. In some embodiments, the void containing the reference gas can be sealed underneath a bonded cap. Therefore, the entire device including all control electronics and packaging could be the size of a few cm$^2$. Further detailed description of the PIC and its modalities are provided herein.

Figure 2:
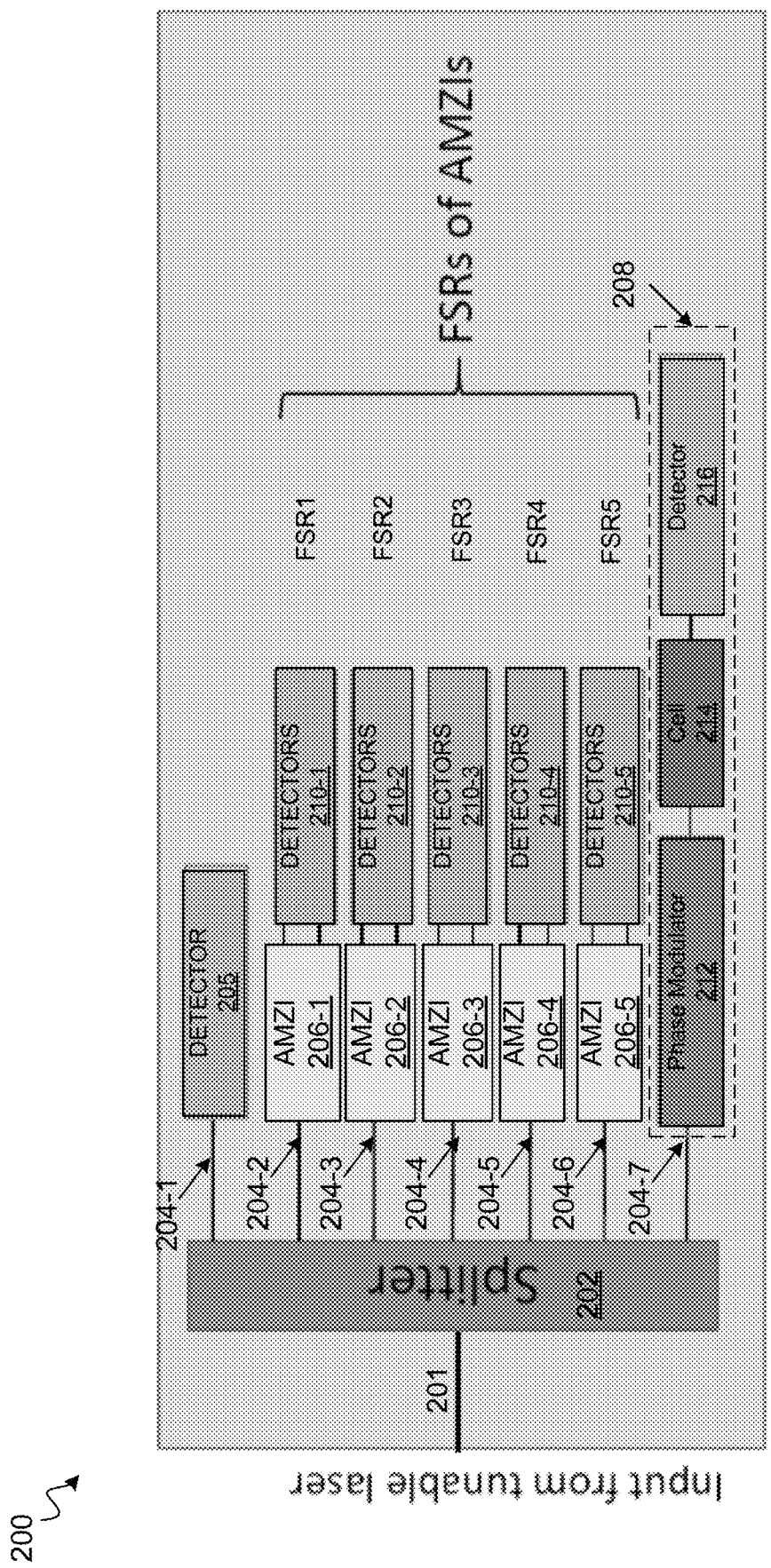
FIG. 2 is a block diagram illustrating an example of a PIC-based wavelength meter system, according to certain aspects of the disclosure.

FIG. 2 is a block diagram illustrating an example of a PIC-based wavelength meter system 200, according to certain aspects of the disclosure. The PIC-based wavelength meter system 200 (hereinafter "PIC system 200") includes a splitter 202, a first detector 205, a number of asymmetric interferometers such AMZIs 206 (e.g., 206-1 through 206-5), detectors 210 (e.g., 210-1 through 210-5) and a phase modulation spectroscopy path 208 including a phase modulator 212, a cell 214 and a second detector 216. The splitter 202 receives an optical input (light) 201 from a light source such as a tunable laser and splits the light 201 into a number of (e.g., 7) optical beams 204 (e.g., 204-1 through 204-7). The first beam 204-1 is used by the first detector 205 (e.g., a photo-diode) that can measure an intensity of the first beam 204-1, which can be the same or proportional to the intensity of each of the other 6 optical beams 204. The optical beams 204-1 through 204-5 are received by the AMZIs 206 and the last optical beam 204-7 is used by the phase modulation spectroscopy path 208.

In one or more implementations, each of the AMZIs 206, as discussed in more detail herein, includes two internal phase modulators that can be driven by respective drive voltages. The drive voltages of the phase modulators of each AMZI 206 can be scanned to generate a pair of optical fringes. The pair of optical fringes are complimentary optical intensity waveforms versus the drive voltage and can be detected by the detectors 210. When looked at outputs of the detectors 210, the fringes are electrical signal intensity versus the drive voltage of the phase modulators of the respective AMZI 206. The AMZIs 206 are similar except for their ambiguity intervals or FSRs that are different. The FSR values FSR1, FSR2, FSR3, FSR4 and FSR5 of the AMZIs 206-1 through 206-5 can be different and have certain relationship for the AMZIs 206 to operate properly and to be capable of providing an unambiguous measurement of the optical wavelength of the light source. For example, if FSR1 (e.g., 40 THz) is the largest FSR value, then, in one embodiment, FSR1 has to be greater than an entire intended operating range of the PIC system 200.

In another embodiment, the FSRs of two interferometers may be made almost, but not exactly, equal, such that the fringe phase of one of the interferometers slips relative to the phase of the other one, as the wavelength is varied, such that the phase slips one whole cycle over a range of wavelength that is larger than the necessary ambiguity interval, either of the entire operating range of the entire wavemeter, or larger than the imprecision of readability of an interferometer with a larger FSR. It would be obvious to those with ordinary skill in the art that various combinations of FSRs of different devices could be employed in a collection of interferometers to make an unambiguous wavelength determination over a range of possible input wavelengths, which has a measurement uncertainty that is less than the uncertainty associated with the measurement made with the device with the largest uncertainty.

In another embodiment, the phase modulation can be used to spectroscopically interrogate one or more of the interferometers, such that phase-sensitive detection of the output beams of the interferometers can result in a signal that passes through zero at the midpoint of the fringes and in a manner that is insensitive to intensity fluctuations, which may be advantageous in some situations.

Further, each of the other FSR values (e.g., FSR2, FSR3, FSR4 and FSR5) has to be smaller than a preceding FSR. In other words, FSR2>FSR3>FSR4>FSR5, and FSR value of each AMZI 206 (e.g., AMZI 206-2) has to exceed a measurement imprecision of the preceding AMZI 206 (e.g., AMZI 206-1). Example values for FSR1, FSR2, FSR3, FSR4 and FSR5 of the AMZIs 206-1 through 206-5 can be 40 THz, 3 THz, 200 GHz, 15 GHz and 1 GHZ.

In some implementations, the phase produced by each AMZI 206 amounts to a coarse wavelength measurement, with some uncertainty arising from finite signal-to-noise Ratio (SNR). Because the SNR is intended to be considerably greater than two, the ratio of FSRs as given by the example values (e.g., 40/3, 30/2, 200/15 and 15/1) is significantly different than two-to-one. The FSR value (e.g., FSR2) of each AMZI 206 (e.g., AMZI 206-2) is chosen to be less than the largest FSR (e.g., FSR1), but still larger than the uncertainty with which the fringe phase from the previous AMZI 206 (e.g., AMZI 206-1) can be confidently placed within. In other words, the fringe phase of the AMZI 206-2 amounts to a finer wavelength measurement, which may be ambiguous within the entire tuning range of the PIC system 200, except that the ambiguity is resolved by the measurement from the AMZI 206-1. However, the precision of even the second measurement by the AMZI 206-2 may be insufficient for system requirements. Accordingly, the additional AMZIs 206-3 to 206-5 are added, for example, with a strategy such that each has an ambiguity interval that safely exceeds the measurement imprecision of the device with the next larger FSR, but which has an FSR that is sufficiently smaller to add significant precision to the resulting wavelength measurement.

As described above, for implementations where the SNR of the fringes is about 20, the FSRs may differ by a ratio of 10-to-1, (giving a comfortable safety margin), in which case the five interferometers (e.g., AMZIs 206) taken together would give a measurement imprecision of 10 millionth ($1/10^5$) of the ambiguity interval of the first interferometer (AMZI 206-1) with the largest FSR (e.g., 40 THz). This would enable a 5-decimal-place measurement, which can be sufficient in many cases. If this precision is not sufficient, additional interferometers (not shown) could be added.

In one or more implementations, the AMZIs 206 can be temperature-stabilized (e.g., using a temperature stabilizer, not shown) to keep the fringe phases stabilized. Alternatively, in other implementations, the fringe phase could be periodically, or, simultaneously, measured with a probe beam produced by a frequency-stabilized laser of a known wavelength (e.g., using a reference laser such as 110 of FIG. 1, which can be part of the PIC system 200).

In some implementations, the measured optical fringe intensities of AMZIs 206 is normalized by dividing by the beam intensity as measured by the first detector 205. In one or more implementations, the phase modulation spectroscopy path 208 may be used to make internal calibration to correct a measured wavelength based on known absorption lines of a reference gas of the cell 214. For example, the correction may include correcting for phase errors due to temperature variation of various elements of the AMZIs 206. In some implementations, the phase modulator 212 may be used to modulate a phase of the optical beam 204-7 (e.g., by using an RF signal with a frequency within a range of about a few hundred MHz to a few GHz). The tunable laser can be scanned across the absorption line (frequency) of the reference gas of the cell 214, and when detected by the second detector 216, can be utilized to perform internal calibration. For example, the AMZIs 206 may have phase deterioration that depends on temperature or other factors, and an independently measured wavelength with the on-board gas cell 214 would allow correction of the phase deterioration as needed.

Figure 3:
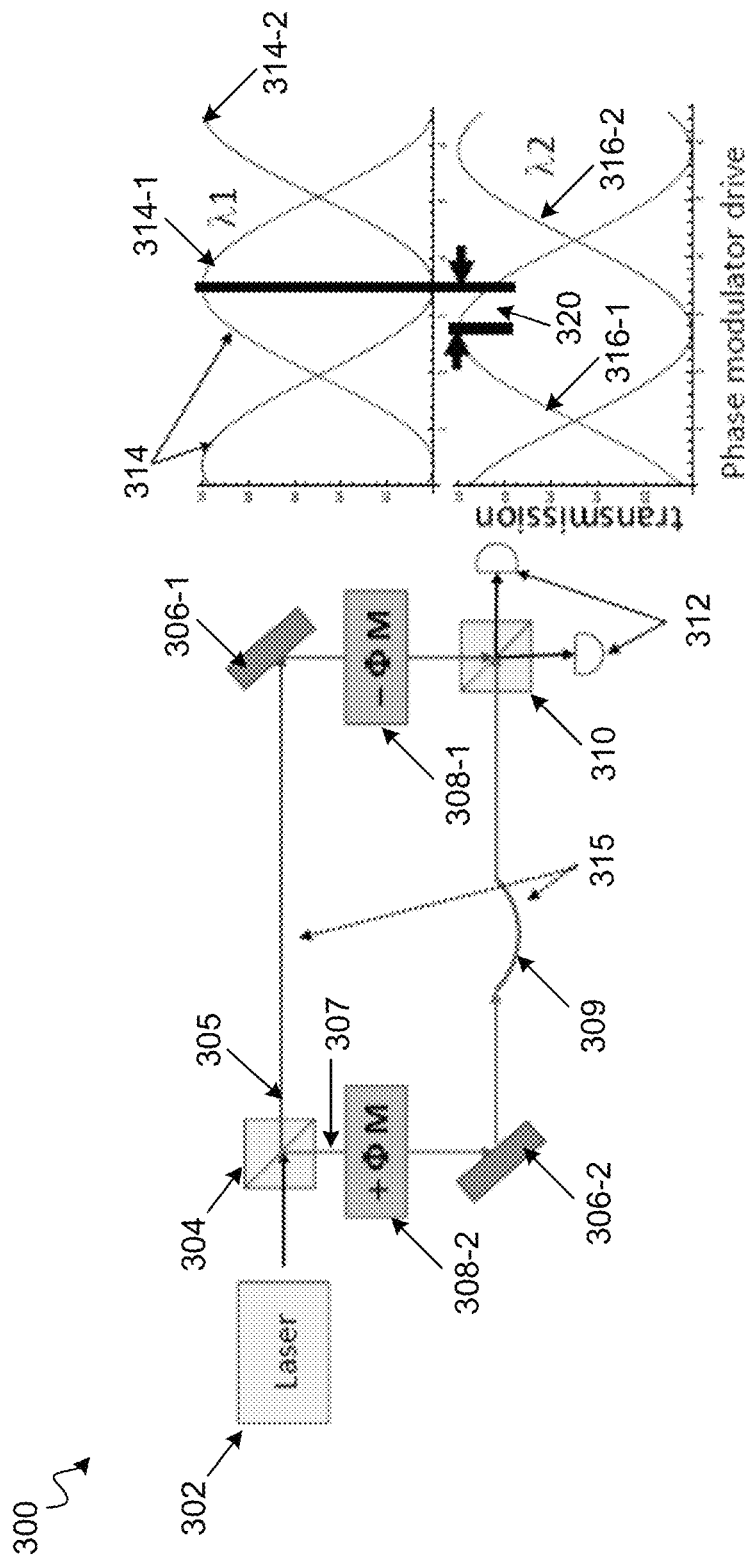
FIG. 3 is a schematic diagram illustrating an example of an interferometer of the PIC-based wavelength meter system of FIG. 2, according to certain aspects of the disclosure.

FIG. 3 is a schematic diagram illustrating an example of an interferometer 300 of the PIC system 200 of FIG. 2, according to certain aspects of the disclosure. The interferometer 300 includes a light source (laser) 302, light splitters 304 and 310, mirrors 306-1 and 306-2, phase modulators 308-1 and 308-2 and detectors 312. The light from the laser 302 is split into a first optical beam 305 and a second optical beam 307. The first optical beam 305 is reflected by the mirror 306-1 and passed to the phase modulator 308-2 and the light splitter 310. The second optical beam 307 is passed to the phase modulator 308-2 then reflected by the mirror 306-2 to reach to the light splitter 310. The optical paths 315 of the first optical beam 305 and the second optical beam 307 have different effective length, as depicted by the section 309. The effective length difference of the optical paths 315 can be created by an electro-optic effect or by a thermo-optical effect and can be adjustable. For example, in an AMZI, a section of waveguide on one arm of the AMZI may be heated to alter the refractive index of that path through the thermo-optical effect, resulting in an optical path length change relative to the other arm of the interferometer. As a result, the output interference condition changes, resulting in a detectable output intensity change. Because the PIC waveguides are very small (e.g., having almost single square micron-class cross sections), the thermal time constant is only of the order of about 1 micro-second (μs). Therefore, an entire fringe could be swept out in just a few microseconds, or less.

At the light splitter 310, both optical beams 305 and 307 are split and components of both optical beams 305 and 307 as they are detected by the detectors 312 interfere (e.g., constructively on one detector and destructively on the other detector) and create interference fringes. Since the optical path of the optical beams 305 and 307 are different, they experience different delays and thus different phases. Further phase shift can be created by the phase modulators 308-1 and 308-2. For example, by scanning drive voltage of the phase modulators 308-1 and 308-2 fringes 314 can be generated by the detectors 312. The interferometer 300, as shown in FIG. 3 may represent any of the AMZIs 206 of FIG. 2. The variation in FSRs of the AMZIs 206 is nothing more than variation in optical paths differences represented by section 309 in different AMZIs 206, which as mentioned above can be controlled, for example, electro-optically or thermo-optically.

A fringe 314-1 may be from one of the detectors 312 and a fringe 314-2 may be from the other one. As the drive voltage of the phase modulators 308-1 and 308-2 are swept, fringes 314 expand out with the phase change. The fringes 314-1 and 314-2 are in fact light intensity waveforms mapped out on the detectors 312 versus drive voltage of the phase modulators 308-1 and 308-2. The phase change also depends on the wavelength ($\lambda$) of the laser light. Because of the asymmetry of the optical path length 215, if the drive voltage is scanned in the same way but a different input wavelength (the wavelength of the laser light, e.g., $\lambda 2$) is used, the phase of the resulting fringes 316-1 and 316-2 may appear to have shifted (e.g., by a value 320) with respect to the fringes 314-1 and 314-2 which are generated with an input wavelength $\lambda 1$. The shift 320 is a measure of change in wavelength ($\lambda$) and can be measured at different points of the corresponding fringes (e.g., 314-1 and 316-1), for example, the summits or crossing point of two detector fringes (e.g., 314-1 and 314-2).

Figure 4:
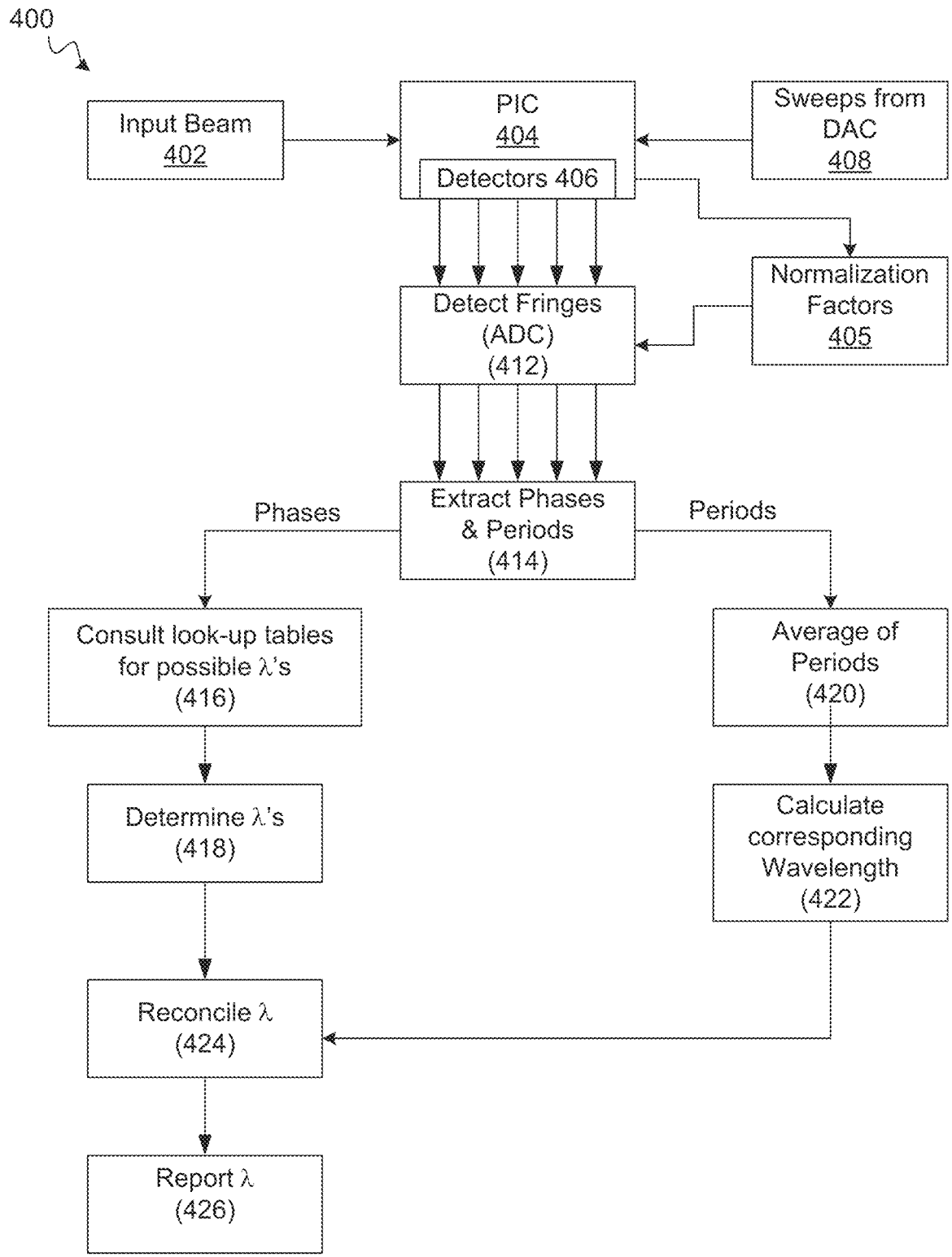
FIG. 4 is a flow diagram illustrating an example modality of the PIC-based wavelength meter system of FIG. 2, according to certain aspects of the disclosure.

FIG. 4 is a flow diagram illustrating an example modality 400 of the PIC system 200 of FIG. 2, according to certain aspects of the disclosure. The example modality 400 shows the process of determining a wavelength of a light source by the PIC system 200 which is represented by PIC 404 including detectors 406. The input beam 402 represents the optical beams 204 of FIG. 2 which are provided to the PIC 404. The sweeps from digital-to-analog (DAC) 408 refers to sweeps of the drive voltage of phase modulators of the AMZIs 206 of FIG. 2. The DAC 408, not shown in FIG. 2, converts digital control signals from a controller (e.g., 130 of FIG. 1) to analog signals that are applied as the drive voltage of phase modulators of the AMZIs 206. The outputs from the detectors 406 and the normalization factors 405 are inputs to the operation block 412. The outputs from the detectors 406 are intensity values and normalization factors 405 are derived from the first detector 205 of FIG. 2, as discussed above. At operation block 412 fringes (e.g., 314-1 and 314-2 of FIG. 3) are detected and converted to digital signals using an analog-to-digital converter (ADC).

The digitized fringes are then utilized, at operation block 414, to extract phases and periods of the fringes from different AMZIs 206. At operation block 416, the extracted phases are compared with values stored in a look-up table. In some implementations, the look-up table can provide wavelengths corresponding to various values of phase entries, based on which, at operation block 418 the wavelengths are determined. In other words, the look-up table may be used to determine, for each interferometer, a modulator drive signal amplitude that can generate complementary fringe values at respective detectors coupled to that interferometer at the desired optical wavelength. Meanwhile, at operation block 420, an average of the extracted periods of the fringes (from operation block 414) are obtained, based on which at operation block 422, a corresponding wavelength is calculated. Because longer wavelengths take more total optical phase difference to span out an entire fringe than shorter wavelengths do, it is possible to use the period of a fringe to measure the wavelength in a coarse way. For example, it takes about 1 micron (1000 nm) of optical path difference (OPD) change to subtend one full fringe at an input wavelength of about 1000 nm. However, it takes only an OPD change of 500 nm to subtend a full wavelength of green light at about 500 nm. Irrespective of whether the OPD is swept out electro-optically, thermo-opticaly, or by some other method, the total amount of actuation needed to sweep out one entire fringe therefore amounts to a coarse wavelength measurement. For example, suppose that it takes a voltage corresponding to an electro-optical phase shift of 800 nm to sweep out one entire fringe (e.g., requiring 8 volts on a waveguide modulator that gives an integrated voltage-dependent phase shift of 100 nm/V using electro-optic tuning). Then the wavelength has to be near 800 nm. Determining how much voltage is needed to span out one fringe amounts to a measurement of the period of the fringe, measured in units of voltage, as the fringe is swept out. This is easiest to do if at least one full fringe is swept out during the voltage sweep, although it is possible to do with less certainty if less than a full fringe is swept out. But, the voltage drive of the modulator, whether thermo-optical, electro-optical, or using some other technology, can be at least one full fringe at the longest intended wavelength of operation of the wavemeter unit.

At operation block 424, the determined wavelengths (from operation block 418) and the wavelength corresponding to the average period (from operation block 422) are reconciled to attain a final value for the optical wavelength of the optical source. The final value of the optical wavelength is then reported, at operation block 426, for example, to a controller (e.g., 130 of FIG. 1).

Figure 5:
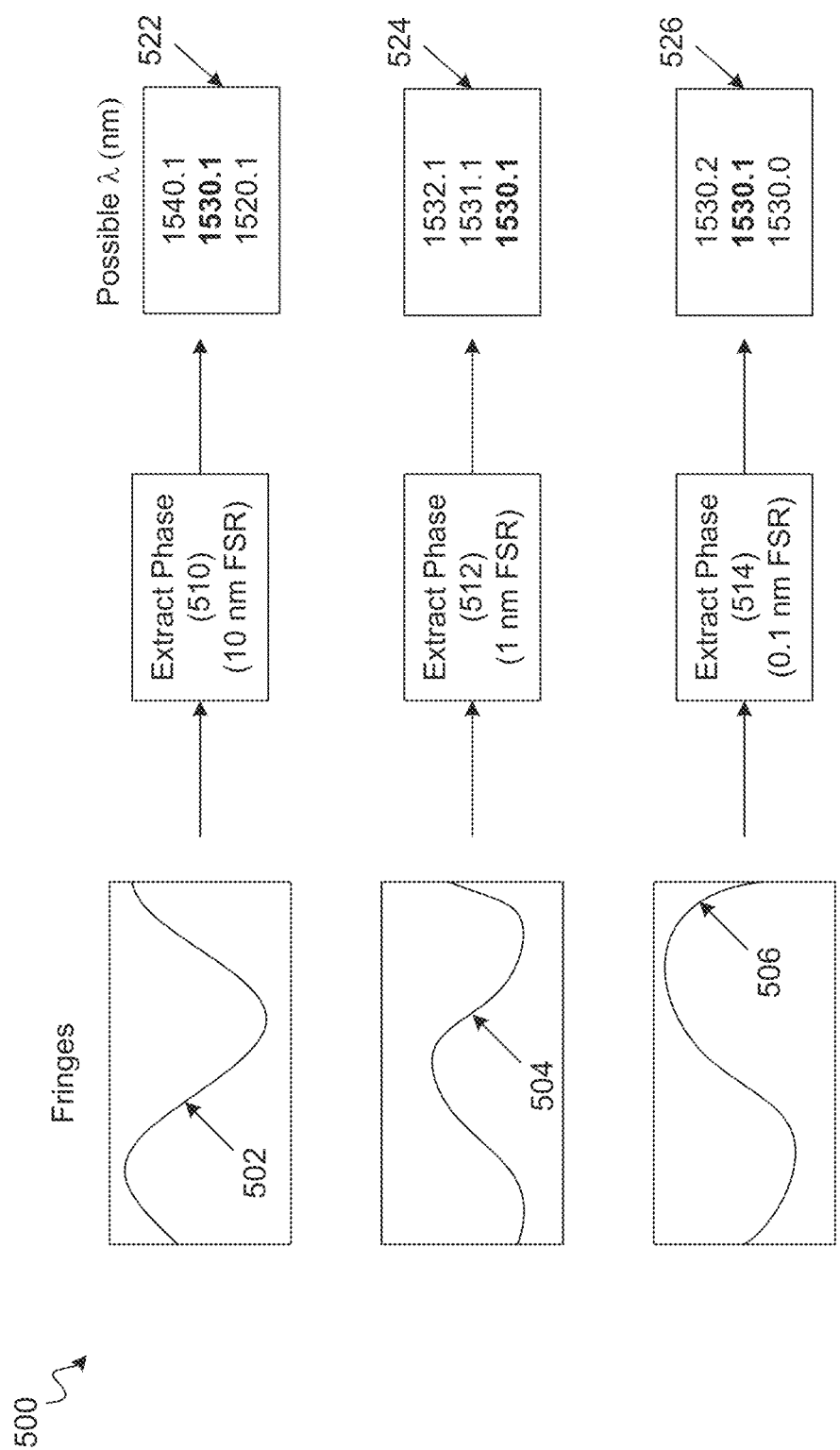
FIG. 5 is a flow diagram illustrating an example process for wavelength determination based on the modality of FIG. 4, according to certain aspects of the disclosure.

FIG. 5 is a flow diagram illustrating an example process 500 for wavelength determination based on the modality 400 of FIG. 4, according to certain aspects of the disclosure. In example process 500, the fringes 502, 504 and 506 detected at operation block 412 of FIG. 4 are used at operation blocks 510, 512, and 514, respectively, to extract corresponding phases. The fringes 502, 504 and 505 may correspond (for ease of exposition) to FSR values of, for example, 10 nm, 1 nm and 0.1 nm, respectively. Possible sets of values of the optical wavelengths determined based on the look-up table (from operation block 416 of FIG. 4) for the fringes 502, 504 and 506 are shown in result boxes 522, 524 and 526. The common value among the three possible sets of values of the optical wavelength is 1530.1 nm that is reported as the final value of the optical wavelength.

Figure 6:
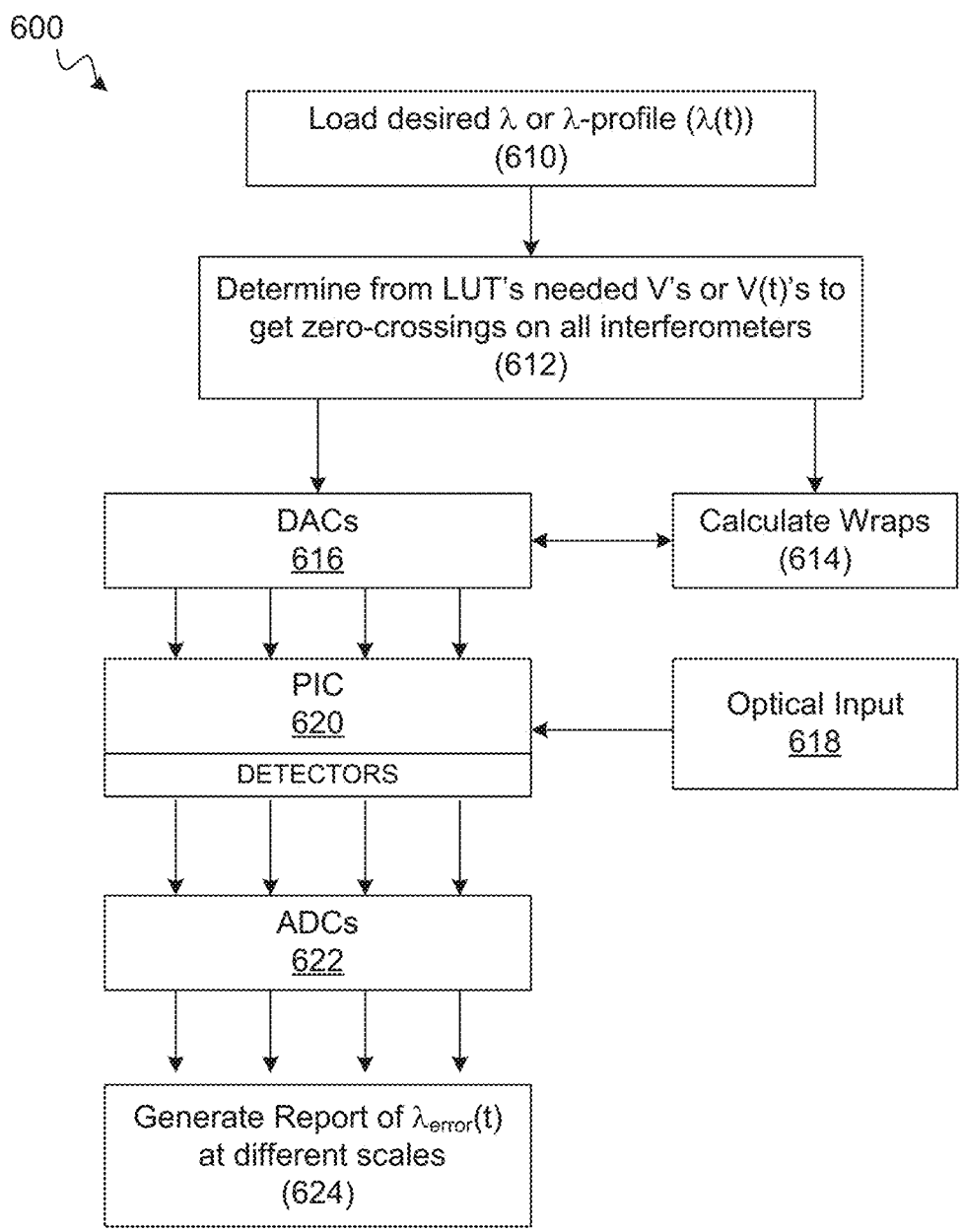
FIG. 6 is a flow diagram illustrating an example modality of the PIC-based wavelength meter system of FIG. 2, according to certain aspects of the disclosure.

FIG. 6 is a flow diagram illustrating an example modality 600 of the PIC system 200 of FIG. 2, according to certain aspects of the disclosure. The example modality 600 is used to gain real-time information regarding detuning of the input wavelength from a desired set point (e.g., a fixed λ) or a wavelength profile (e.g., λ(t)).

In one or more aspects, the desired set point is a fixed wavelength (λ) and PIC system 200 can report detuning of the light source wavelength from the fixed wavelength (λ). In these aspects, the PIC system 200 of FIG. 2 has all of its interferometers (e.g., AMZIs 206) set to give a notionally fixed (e.g., 50%) transmission through each of the interferometers, such that the difference amplifiers coupled to detectors 210 of FIG. 2 (not shown in FIG. 2 for simplicity) give zero output. The example modality 600 starts at operation block 610, where the desired fixed wavelength (λ) or the profile λ(t) is loaded in the PIC system 200. At operation block 612, the PIC system 200 (e.g., a processor of the system such as 130 of FIG. 1, not shown in FIG. 2 for simplicity) uses look-up tables (LUTs) as needed to determine required drive voltages (e.g., V values or V(t) profiles) of the phase modulators to achieve zero-crossing point on all of the interferometers (e.g., AMZIs 206). At operation block 614, based on the FSRs of the interferometers, wrap around wavelengths are calculated, which are passed along with the zero-crossing drive voltages (from operation block 612) to the DACs 616. The DACs 616 provide analog signals for the PIC 620 (which can represent PIC system 200). The PIC 620 also receives optical input 618 (e.g., laser light) and uses the analog signals from the DACs to set zero-crossing point of the interferometers. The output signal from detectors (e.g., 210 of FIG. 2) are converted by the ADC 622 to digital signals, which are reported, at operation block 624, to the controller (e.g., 130 of FIG. 1) at different scales corresponding to the slopes of the different interferometer fringes.

The zero-crossing point is on the steepest, and also, most linear, section of each of the sinusoidal fringes (e.g., 314-1 of FIG. 3). If the wavelength of the input laser light is at the fixed wavelength, then all the difference amplifiers would give zero output, except for shot noise. However, if the input laser light deviates from the intended fixed wavelength, the output intensities of the two detectors (e.g., 210 of FIG. 2) of each interferometer goes out of balance, increasing the intensity at one detector and decreasing the intensity at the other detector (by conservation of energy). This situation also causes the output of the difference amplifier (coupled to detectors 210, not shown in FIG. 2) to deviate away from zero output, with twice the magnitude. The conversion between detectors output intensity versus frequency (or wavelength) detuning depends both on the intensity of the input laser light and also on the FSR of the particular interferometer. This is because it would take different amounts of frequency detuning to run a certain fraction of a full fringe away from the zero-crossing point for each of the different interferometers. Therefore, it would be necessary to normalize for input intensity, using the first detector 205 of FIG. 2. Accordingly the output from the wavemeter in this modality is a collection of different signals amounting to the time-dependent detuning of the laser, containing both sign and magnitude information, at different scales corresponding to the slopes of the different interferometer fringes.

It is understood that the bandwidth of the detector outputs are given by the bandwidth of the photodetectors, not by any integration times nor computation times. For example, if an optical pulse lasting about 500 ns was used as input, and if the pulse was chirped within the pulse duration, the output signals would deviate during the pulse, and show this chirp, subject only to the condition that the detectors were significantly faster than about 2 MHz bandwidth, as the necessary condition to see significant structure within a pulse of 500 ns duration. In fact, typical photodetector bandwidths are within a range of about 100 MHz to 1 GHz, allowing the instantaneous frequency information be derived within a range of about 10 ns to 1 ns timescale. This is more than a thousand times faster than a conventional wavemeter meter can support. It is noted that another limitation may arise from different delays in the various AMZIs 206. Given a delay difference of about 1 ns for an AMZI of 1 GHz FSR, fluctuations on the time scale less than about 1 ns would appear as phase error signals rather than frequency error signals. Accordingly, the example modality 600 can be used to support the verification of chirps or other complex, high-bandwidth waveforms, including both the presence and depth of the modulation, as well as the detuning away from the desired center wavelength, which are not supported by the conventional wavemeters.

When the wavelength of the input laser light is variable (e.g., with a wavelength profile), the operation is the same as shown in FIG. 6, except that the driver voltage of the interferometers are not left fixed. Accordingly, wavelength-versus-time schedule is converted into corresponding phase modulator drive signals-versus-time, such that the zero-crossing points of the interferometers become dynamic, within the set limits of the respective modulators.

Figure 7:
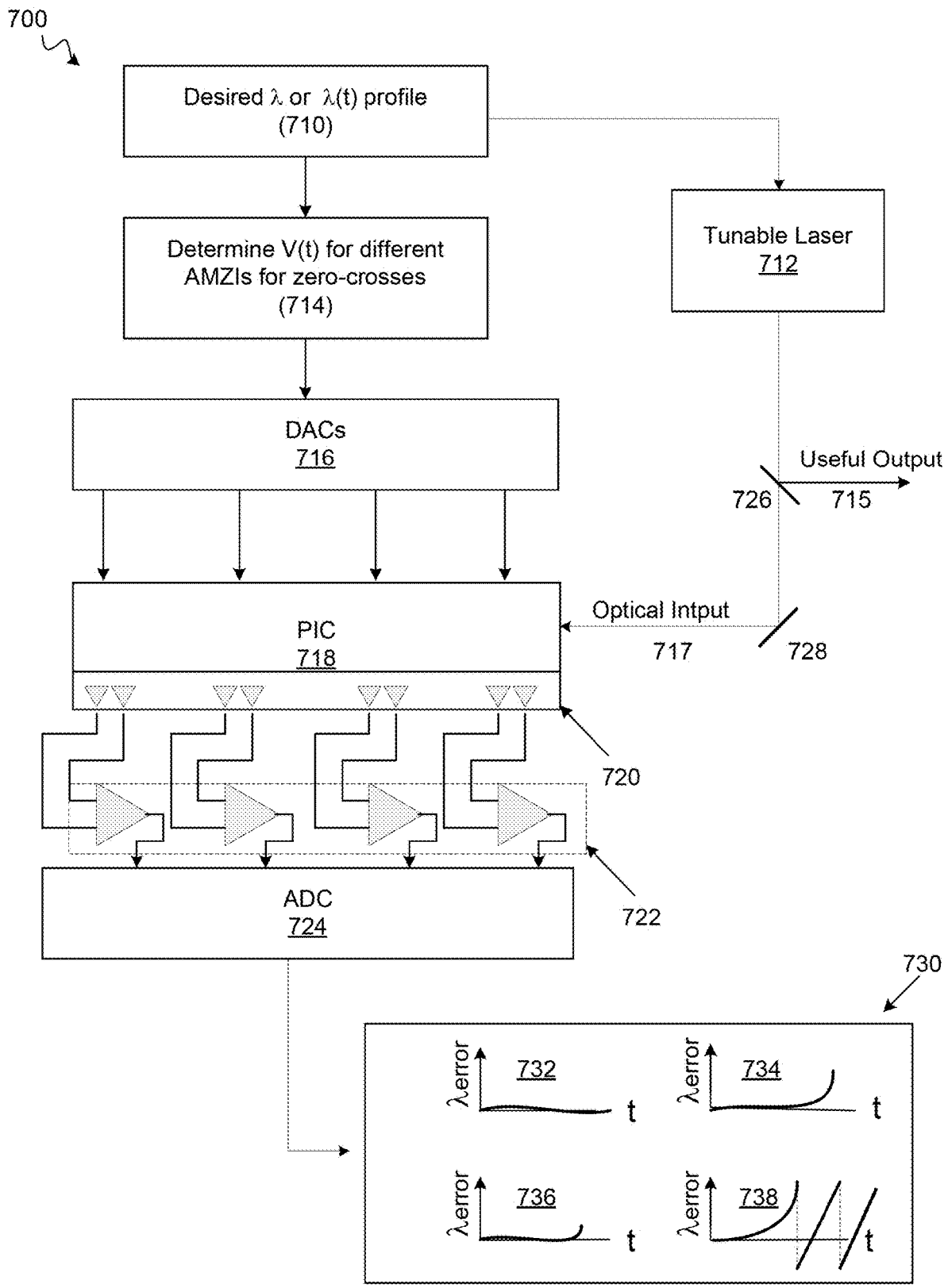
FIG. 7 is a flow diagram illustrating an example modality of the PIC-based wavelength meter system of FIG. 2, according to certain aspects of the disclosure.

FIG. 7 is a flow diagram illustrating an example modality 700 of the PIC system 200 of FIG. 2, according to certain aspects of the disclosure. The example modality 700 starts at operation block 710, where a desired driver voltage time function (e.g., V(t)) for zero-crossing point of each AMZI 206 of FIG. 2 is determined. The determined zero crossing driver voltage time functions are converted by the DACs 716 to analog signal and provided along with an optical input 717, which is a first portion of the light from the tunable light source (laser) 712, to the PIC 718. The first portion of the light from the tunable light source (laser) 712 is separated by the splitter 726 and reflected by the mirror 728 into the PIC 718. The second portion of the of the light from the tunable light source (laser) 712 can be used as a useful output for other applications.

The detectors 720 of the PIC 718 are coupled to the difference amplifiers 722, the output signals of which are provides as wavelength error ($\lambda_{error}$) to the ADC 724 for conversion to digital signals. The digital signals are then processed by the processor (e.g., 130 of FIG. 1) and reported as charts of $\lambda_{error}$ versus time at different ranges of $\lambda_{error}$. The charts 732, 734, 736 and 738 represent variation of $\lambda_{error}$ versus time for decreasing ranges. For example, the chart 732 shows the variation of $\lambda_{error}$ versus time for the widest range and the chart 738 shows the variation of $\lambda_{error}$ versus time for the finest range. The wraps around are observed in the chart 738 where the $\lambda_{error}$ values become exceeding large at certain time intervals corresponding to known values of the wavelength of the input laser light 712.

Figure 8:
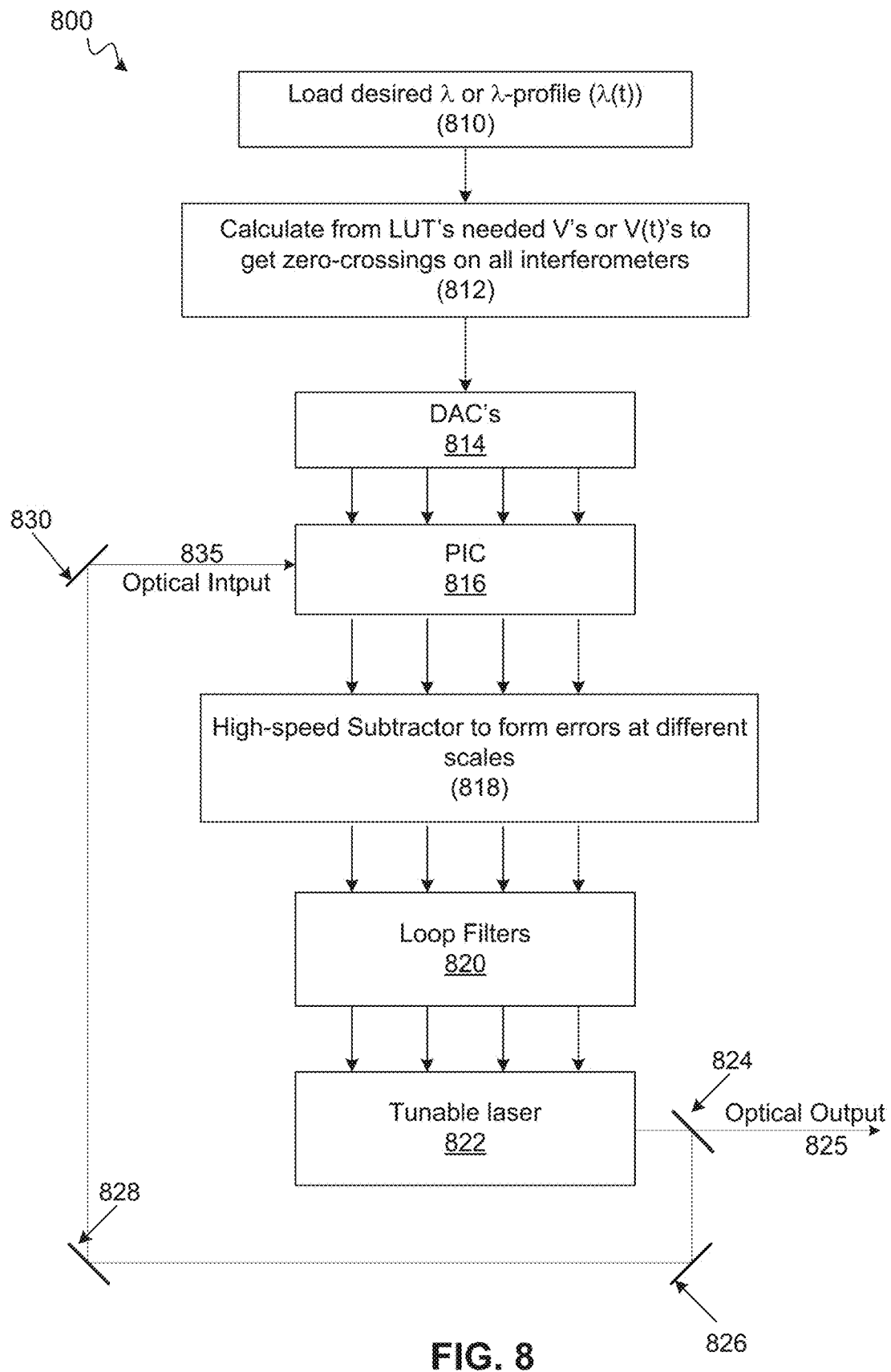
FIG. 8 is a flow diagram illustrating an example modality of the PIC-based wavelength meter system of FIG. 2, according to certain aspects of the disclosure.

FIG. 8 is a flow diagram illustrating an example modality 800 of the PIC system 200 of FIG. 2, according to certain aspects of the disclosure. In the example modality 800 is a control mode of operation, where the error signals at different scales are used as feedback signals to control the tunable laser (e.g., 822). The example modality 800 starts at operation 810, where the desired fixed wavelength ($\lambda$) or the profile $\lambda(t)$ is loaded in the PIC system 200. At operation block 812, the PIC system 200 (e.g., a processor of the system such as 130 of FIG. 1, not shown in FIG. 2 for simplicity) uses look-up tables (LUTs) as needed to determine required drive voltages (e.g., V values or V(t) profiles) of the phase modulators to achieve zero-crossing point on all of the interferometers (e.g., AMZIs 206). The zero-crossing drive voltages (from operation block 812) are passed to the DACs 814. The DACs 814 provide analog signals to the PIC 816 (which can represent PIC system 200). The PIC 816 also receives optical input 835 (from the laser light 822) and uses the analog signals from the DACs to set zero-crossing point of the interferometers. The output signal from detectors (e.g., 210 of FIG. 2) are fed, at operation block 818, to high-speed subtractor (e.g., of the micro-controller 130 of FIG. 1) to form errors at different scales corresponding to the slopes of the different interferometer fringes. The subtractor results are passed to servo-loop filters 820 and from there to tuning elements (actuators) of the tunable laser 822. The tunable laser 822 provides the optical input 835 through the splitter 824 and mirrors 826, 828 and 830. A main portion of the light from the tunable laser 822 is provided by the splitter 824 as the optical output 825 of the PIC system 200.

While even conventional wavemeters may be used to measure wavelength and then generate an error, the effective bandwidth of this process is limited by the Nyquist limit of the measurement rate. For example, the existing commercial-off-the-shelf (COTS) wavemeters may offer about 1 kHz of measurement rate, giving a 500 Hz Nyquist-limited information bandwidth, and, realistically, perhaps a useable servo control bandwidth of within a range of about 50 to 100 Hz. Even using a wavemeter giving measurements at a desired rate of 10 μs per measurement (100 k measurements/s) gives a Nyquist-limited bandwidth of 50 kHz, and a realistic servo bandwidth of about 5-10 kHz, which is on par, or even slower than, the speed of many lead zirconate titanate (PZT) actuators, but is significantly slower than is possible with the current tuning of semiconductor lasers, acousto-optic frequency or phase shifters or electro-optic phase modulators. In contrast, the subject PIC system 200, in control mode, can have a bandwidth limited by the photodetector bandwidths, e.g. tens or hundreds of MHz, or perhaps into the GHz range, which is thousands of time faster than the existing wavemeters can offer.

Figure 9:
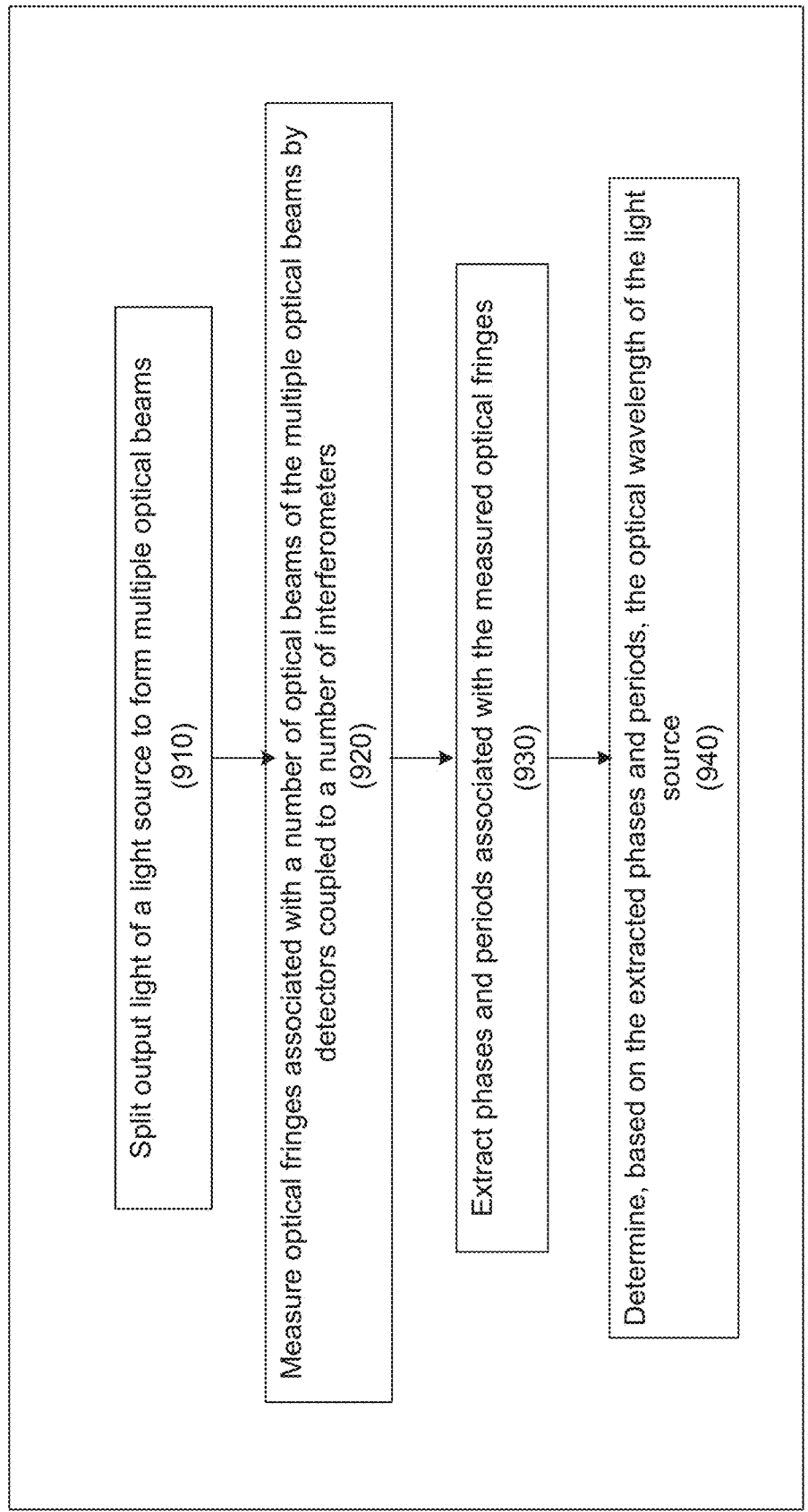
FIG. 9 is a flow diagram illustrating an example method of measuring an optical wavelength of a light source, according to some aspects of the subject technology.

FIG. 9 is a flow diagram illustrating an example method 900 of measuring an optical wavelength of a light source (e.g., 302 of FIG. 3), according to some aspects of the subject technology. The method 900 starts with splitting (e.g., using 202 of FIG. 2) output light (e.g., 201 of FIG. 2) of a light source to form multiple optical beams (e.g., 204 of FIG. 2) (910). The method further includes measuring optical fringes (e.g., 314 of FIG. 3) associated with the optical beams by detectors (e.g., 210-1 through 210-5 of FIG. 2) coupled to a number of interferometers (e.g., 206-1 through 2106-5 of FIG. 2) (920). Phases and periods associated with the measured optical fringes are extracted (e.g., 424 of FIG. 4) (930), and based on the extracted phases and periods, the optical wavelength of the light source are determined (e.g., in FIG. 5)(940). Measuring the optical fringes is performed by the interferometers having different free spectral ranges (FSRs) disposed on a photonic integrated circuit (PIC) (e.g., 200 of FIG. 2). The largest FSR value (e.g., FSR1 of FIG. 2) of the interferometers is greater than an entire intended operating range of the PIC.

Figure 10:
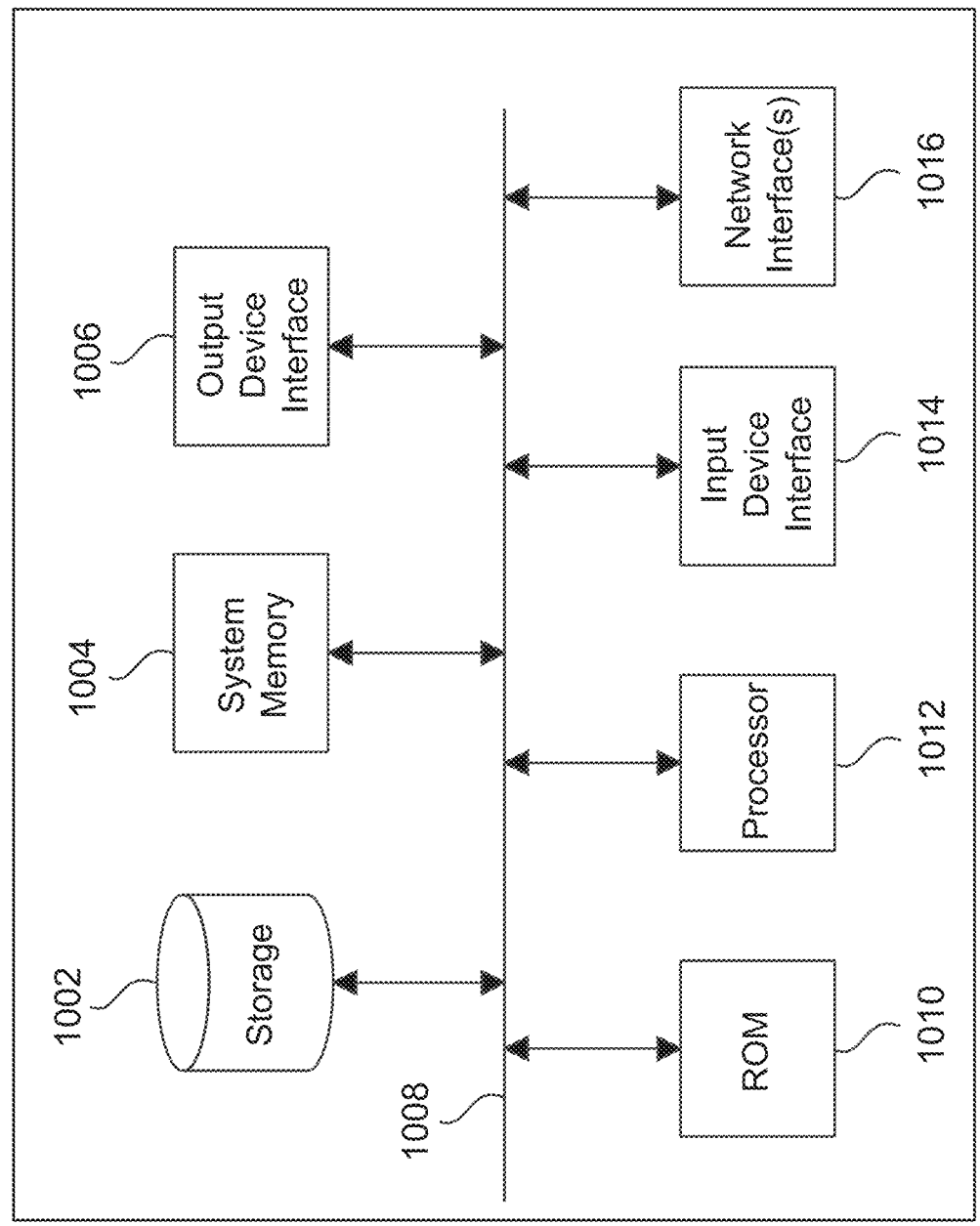
FIG. 10 is a block diagram conceptually illustrating an electronic system with which aspects of the subject technology are implemented.

FIG. 10 is a block diagram conceptually illustrating an electronic system 1000 with which aspects of the subject technology are implemented. The electronic system 1000, for example, can be the microcontroller 130 of FIG. 1. The electronic system 1000 includes a bus 1008, one or more processing unit(s) 1012, a system memory 1004, a read-only memory (ROM) 1010, a permanent storage device 1002, an input device interface 1014, an output device interface 1006, and a network interface 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations. In one or more implementations, the one or more processing unit(s) 1012 is an implementation of the micro-controller 130 of FIG. 1. In some implementations, the one or more processing unit(s) 1012 can perform one or more processing steps of the flow diagrams of FIGS. 4 through 9.

The ROM 1010 stores static data and instructions that are needed by the one or more processing unit(s) 1012 and other modules of the electronic system. The permanent storage device 1002, on the other hand, is a read-and-write memory device. The permanent storage device 1002 is a non-volatile memory unit that stores instructions and data even when the electronic system 1000 is off. One or more implementations of the subject disclosure use a mass-storage device (such as a magnetic or optical disk and its corresponding disk drive) as the permanent storage device 1002.

Other implementations use a removable storage device (such as a floppy disk, flash drive, and its corresponding disk drive) as the permanent storage device 1002. Like the permanent storage device 1002, the system memory 1004 is a read-and-write memory device. However, unlike the permanent storage device 1002, the system memory 1004 is a volatile read-and-write memory, such as random access memory. System memory 1004 stores any of the instructions and data that the one or more processing unit(s) 1012 needs at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input device interface 1014 and the output device interface 1006. The input device interface 1014 enables a user to communicate information and select commands to the electronic system. Input devices used with the input device interface 1014 include, for example, alphanumeric keyboards and pointing devices (also called "cursor control devices"). The output device interface 1006 enables, for example, the display of images generated by the electronic system 1000. Output devices used with the output device interface 1006 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks (not shown) through one or more network interfaces 1016. In this manner, the computer can be a part of one or more network of computers (such as a local area network ("LAN"), a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Illustration of Some Aspects of Subject Technology as Clauses

Various examples of certain aspects of the disclosure are described as numbered clauses (1, 2, 3, etc.) for convenience. These are provided as examples, and do not limit the subject technology.

1. A method of measuring an optical wavelength of a light source, the method comprising:

splitting, using an optical splitter, output light of a light source to form multiple optical beams;

measuring optical fringes associated with a plurality of optical beams of the multiple optical beams by detectors coupled to a plurality of tunable interferometers;

extracting phases and periods associated with the measured optical fringes; and determining, based on the extracted phases and periods, the optical wavelength of the light source, wherein measuring the optical fringes is performed by a plurality of tunable interferometers having different free spectral ranges (FSRs) disposed on a photonic integrated circuit (PIC), and wherein a largest FSR value of the different FSRs is greater than an entire intended operating range of the PIC.

2. The method of clause 1, wherein each of the plurality of tunable interferometers comprises an asymmetric interferometer, and wherein the asymmetric interferometer comprises an asymmetric Mach-Zehnder interferometer (AMZI).

3. The method of clause 1, further comprising coupling a first detector to the optical splitter and configuring the first detector to measure an intensity of a portion of the optical signal of the light source received by the first detector.

4. The method of clause 3, wherein one or more detectors coupled to each interferometer of the plurality of tunable interferometers is normalized based on the measured intensity.

5. A photonic integrated circuit (PIC) comprising:
an optical splitter coupled to a light source and configured to generate multiple optical beams;
a plurality of tunable interferometers coupled to the optical splitter to receive respective optical beams;
one or more detectors coupled to each interferometer of the plurality of tunable interferometers; and
a phase modulation spectroscopy path configured to allow corrections of deviations due to one or more environmental variations,
wherein the plurality of tunable interferometers have different ambiguity intervals and a largest ambiguity interval value of the different ambiguity intervals is greater than an entire intended wavelength measurement range of the PIC.

6. The PIC of clause 5, wherein the periods of the plurality of fringes are measured and averaged, wherein the average fringe is used to calculate a coarse wavelength with an associated uncertainty in wavelength, wherein the plurality of tunable interferometers have different free spectral ranges (FSRs), and a largest FSR value of the different FSRs is greater than the uncertainty interval of the coarse wavelength measured from the fringe period.

7. The PIC of clause 5, wherein the plurality of tunable interferometers have different free spectral ranges (FSRs), and the wavelength range over which two or more of the interferometers exhibit a dephasing period between their respective FSRs over a range that is greater than an entire intended wavelength measurement range of the PIC.

8. The PIC of clause 5, wherein the plurality of tunable interferometers have different free spectral ranges (FSRs), wherein the plurality of interferometers are swept so as to map out substantially entire fringes from each interferometer, wherein the periods of the plurality of fringes are measured and averaged, wherein the average fringe is used to calculate a coarse wavelength with an associated uncertainty in wavelength, wherein the plurality of tunable interferometers have different free spectral ranges (FSRs), and the wavelength range over which two or more of the interferometers exhibit a dephasing period between their respective FSRs over a range that is greater than the uncertainty in measured wavelength using the fringe periods.

9. The PIC of clause 8, wherein each of the plurality of interferometers comprises an asymmetric Mach-Zehnder interferometer (AMZI), wherein the PIC further comprises a first detector coupled to the optical splitter and configured to measure an intensity of an optical beam of the multiple optical beams, and wherein the one or more detectors comprise two detectors and the PIC further comprises differential amplifiers coupled to the two detectors of each interferometer.

10. The PIC of clause 8, wherein each of the plurality of interferometers comprises an asymmetric Mach-Zehnder interferometer (AMZI), wherein the PIC further comprises a phase modulation spectroscopy path comprising a phase modulator before the interferometers and one or more detector configured to measure an intensity of an optical beam of the multiple optical beams, and wherein the one or more detectors comprise a phase-sensitive detector and resulting detected and demodulated signals comprise error signals for use as control or monitor signals.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. An apparatus comprising:
a photonic integrated circuit (PIC) configured to measure an optical wavelength of a light source, the PIC including:
an optical splitter coupled to the light source;
a plurality of tunable interferometers coupled to the optical splitter, an interferometer of the plurality of tunable interferometers receiving a portion of an optical signal of the light source;
one or more detectors coupled to each interferometer of the plurality of interferometers; and
an analog-to-digital converter (ADC) coupled to the one or more detectors and configured to convert detected and normalized fringes to digital signals,
wherein the plurality of tunable interferometers have different free spectral ranges (FSRs), the FSRs of a first tunable interferometer and a second tunable interferometer being similar such that a fringe phase of the first tunable interferometer slips one whole cycle relative to a phase of the second tunable interferometer as a wavelength of the light source is varied over a range larger than an ambiguity interval of tunable interferometer, and a largest FSR value of the different FSRs is greater than an entire intended wavelength measurement range of the PIC, and wherein the PIC is compact and not larger than a postage stamp.

2. The apparatus of claim 1, wherein each of the plurality of tunable interferometers comprises an asymmetric Mach-Zehnder interferometer (AMZI).

3. The apparatus of claim 1, further comprising a first detector coupled to the optical splitter and configured to measure an intensity of the portion of the optical signal of the light source received by the first detector.

4. The apparatus of claim 3, wherein the one or more detectors coupled to each interferometer of the plurality of tunable interferometers is normalized based on the measured intensity to generate the detected and normalized fringes.

5. The apparatus of claim 4, wherein the one or more detectors coupled to each interferometer of the plurality of tunable interferometers is configured to measure a fringe phase and a fringe period corresponding to the optical signal.

6. The apparatus of claim 5, further comprising a controller circuit configured to process fringe phases and fringe periods measured by detectors associated with the plurality of tunable interferometers and to determine the optical wavelength of the light source based on the fringe phases and the fringe periods.

7. The apparatus of claim 1, wherein a first interferometer of two successive interferometers of the plurality of tunable interferometers has a higher FSR value than a second interferometer of the two successive interferometers, and wherein an FSR value of the second interferometer is selected to exceed a measurement imprecision of the first interferometer.

8. The apparatus of claim 1, wherein the one or more detectors include a detector pair coupled to a differential amplifier configured to generate an error signal, and the apparatus further comprises a controller circuit configured to process error signals of detector pairs coupled to the plurality of interferometers.

9. The apparatus of claim 8, wherein the light source comprises a tunable laser, and the controller circuit is configured to tune a wavelength of the tunable laser based on the processed error signals, wherein the PIC provides a readout capability at substantially higher than 1 kHz rate that allows obtaining servo information in a continuous-wave context at bandwidths more than about 500 Hz.

10. The apparatus of claim 1, further comprising a phase modulation spectroscopy path including a phase modulator, a reference gas cell and a detector configured to allow correction of a measured wavelength based on known absorption lines of the reference gas.

11. A method of measuring an optical wavelength of a light source, the method comprising:
splitting output light of a light source to form multiple optical beams;
measuring optical fringes associated with a plurality of optical beams of the multiple optical beams by detectors coupled to a plurality of interferometers;
normalizing and converting the measured optical fringes to digital signals;
extracting phases and periods associated with the measured optical fringes from the digital signals; and
determining, based on the extracted phases and periods, the optical wavelength of the light source,
wherein measuring the optical fringes is performed by a plurality of tunable interferometers having different free spectral ranges (FSRs) disposed on a photonic integrated circuit (PIC), the FSRs of a first tunable interferometer and a second tunable interferometer being similar such that a fringe phase of the first tunable interferometer slips one whole cycle relative to a phase of the second tunable interferometer as a wavelength of the light source is varied over a range larger than an ambiguity interval, and wherein a largest FSR value of the different FSRs is greater than an entire intended operating range of the PIC, and wherein the PIC is compact and not larger than a postage stamp.

12. The method of claim 11, further comprising measuring an intensity of an optical beam of the multiple optical beams, and normalizing the measured optical fringes based on the measured intensity.

13. The method of claim 11, wherein measuring optical fringes comprises sweeping a range of phases by each interferometer of the plurality of interferometers.

14. The method of claim 11, further comprising using extracted periods to determine an average period, and determining a corresponding wavelength based on the average period.

15. The method of claim 14, determining the optical wavelength of the light source comprises determining multiple possible optical wavelengths based on a look-up table and reconciling the determined multiple possible optical wavelengths with the determined corresponding wavelength based on the average period.

16. The method of claim 11, wherein the light source comprises a tunable laser, and the method further comprises determining a detuning of the tunable laser with respect to a desired optical wavelength.

17. The method of claim 16, determining the detuning of the tunable laser is based on a plurality of error signals, wherein determining the plurality of error signals comprises:

using a look-up table to determine, for each interferometer, a modulator drive signal amplitude that can generate complementary fringe values at respective detectors coupled to that interferometer at the desired optical wavelength;

applying determined drive signal amplitudes to modulators of respective interferometers; and reading the plurality of error signals at different scales at output nodes of differential amplifiers coupled to the respective detectors.

18. The method of claim 17, further comprising processing the plurality of error signals to generate a feedback signal and using the feedback signal to adjust the tunable laser to achieve the desired optical wavelength.

19. A photonic integrated circuit (PIC) comprising:

an optical splitter coupled to a light source and configured to generate multiple optical beams;

a plurality of tunable interferometers coupled to the optical splitter to receive respective optical beams;

one or more detectors coupled to each interferometer of the plurality of interferometers;

an analog-to-digital converter (ADC) coupled to the one or more detectors and configured to convert detected and normalized fringes to digital signals; and a phase modulation spectroscopy path configured to allow corrections of deviations due to one or more environmental variations, wherein the plurality of tunable interferometers have different ambiguity intervals, wherein free spectral ranges (FSRs) of a first tunable interferometer and a second tunable interferometer are similar such that a fringe phase of the first tunable interferometer slips one whole cycle relative to a phase of the second tunable interferometer as a wavelength of the light source is varied over a range larger than an ambiguity interval of tunable interferometer, and a largest ambiguity interval value of the different ambiguity intervals is greater than an entire intended wavelength measurement range of the PIC, and wherein the PIC is compact and not larger than a postage stamp.

20. The PIC of claim 19, wherein each of the plurality of tunable interferometers comprises an asymmetric Mach-Zehnder interferometer (AMZI), wherein the PIC further comprises a first detector coupled to the optical splitter and configured to measure an intensity of an optical beam of the multiple optical beams, and wherein the one or more detectors comprise two detectors and the PIC further comprises differential amplifiers coupled to the two detectors of each interferometer.

* * * * *